(12) United States Patent
Mitra et al.

(10) Patent No.: US 10,640,037 B1
(45) Date of Patent: May 5, 2020

(54) EMPATHY-BASED SPEED ALERT

(71) Applicant: Ford Global Technologies, LLC, Dearborn, MI (US)

(72) Inventors: Pramita Mitra, West Bloomfield, MI (US); Yifan Chen, Ann Arbor, MI (US); Qianyi Wang, Canton, MI (US); Abhishek Sharma, Ann Arbor, MI (US); Brian Nash, Northville, MI (US); Theodore Wingrove, Plymouth, MI (US); Adam Brooks, Detroit, MI (US); Jenna Love, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/174,877

(22) Filed: Oct. 30, 2018

(51) Int. Cl.
*B60Q 1/00* (2006.01)
*B60Q 9/00* (2006.01)
*G08G 1/052* (2006.01)
*G08G 1/01* (2006.01)

(52) U.S. Cl.
CPC ............ *B60Q 9/00* (2013.01); *G08G 1/0129* (2013.01); *G08G 1/052* (2013.01)

(58) Field of Classification Search
CPC ........ B60Q 9/00; G08G 1/0129; G08G 1/052; G08G 1/096708; G08G 1/0133; G08G 1/0141; G08G 1/017; G08G 1/20; G08G 1/0112; G08G 1/096775; G08G 1/096741; G08G 1/015; G08G 1/096716; B60W 40/09; B60W 2540/30; B60W 2040/0872; G07C 5/085; G07C 5/008; G07C 5/0841

USPC .......................... 340/439, 441, 457, 466, 936
See application file for complete search history.

(56) References Cited

U.S. PATENT DOCUMENTS

| | | | | |
|---|---|---|---|---|
| 2008/0319602 | A1* | 12/2008 | McClellan | G07C 5/008 701/31.4 |
| 2009/0066539 | A1* | 3/2009 | Uemura | G08G 1/052 340/905 |
| 2013/0049994 | A1 | 2/2013 | Nicholson | |
| 2016/0347241 | A1* | 12/2016 | Gralto | B60W 40/105 |
| 2017/0263120 | A1* | 9/2017 | Durie, Jr. | G08G 1/205 |
| 2018/0174446 | A1* | 6/2018 | Wang | G08G 1/0112 |

FOREIGN PATENT DOCUMENTS

| | | |
|---|---|---|
| CN | 203401972 U | 1/2014 |
| EP | 1717777 B1 | 12/2011 |
| EP | 3007148 A1 | 4/2016 |
| JP | 2010127734 A | 6/2010 |
| JP | 2016188069 A | 11/2016 |
| WO | 2017036939 A1 | 3/2017 |

OTHER PUBLICATIONS https://play.google.com/store/apps/details?id=com.innovactory.maxs, Maxs Boete en Snelheidsmeter, Android Apps on Google Play, 5 pages, Oct. 31, 2017.

\* cited by examiner

*Primary Examiner* — Anh V La
(74) *Attorney, Agent, or Firm* — Brooks Kushman PC

(57) ABSTRACT

A vehicle includes a controller, programmed to responsive to detecting a speeding event, generate an alert factor and send an alert to at least one of an in-vehicle output device or an outside-vehicle output device based on the alert factor; and responsive to detecting a user failing to respond, increase the alert factor and send the alert for output based on the increased alert factor.

20 Claims, 4 Drawing Sheets

EMPATHY-BASED SPEED ALERT

TECHNICAL FIELD

The present disclosure is generally related to a vehicle alert system. More specifically, the present disclosure is related to an empathy-based speed alert system.

BACKGROUND

Many vehicles are provided with alert systems that alert the user when certain predefined events are detected. For instance, a speed alert may output beeping sound when the vehicle speed is above the speed limit. However, most current alert systems output the alert indiscriminately without considering the personal profile of the vehicle user, such as age, driving record, etc.

SUMMARY

In one or more illustrative embodiments of the present disclosure, a vehicle includes a controller, programmed to responsive to detecting a speeding event, generate an alert factor and send an alert to at least one of an in-vehicle output device or an outside-vehicle output device based on the alert factor; and responsive to detecting a user failing to respond, increase the alert factor and send the alert for output based on the increased alert factor.

In one or more illustrative embodiments of the present disclosure, a method for a vehicle includes collecting input data including at least one of: user history data, area history data, or real-time data; responsive to detecting the vehicle is speeding, generating an alert impact factor based on the input data; outputting an alert via at least one of an in-vehicle output device based on the alert impact factor; responsive to detecting a user failing to respond, increasing the alert impact factor and elevating an alert level based on the increased alert impact factor; and sending the alert to an outside-vehicle output device based on an elevated alert level.

In one or more illustrative embodiments of the present disclosure, a non-transitory computer-readable medium includes instructions that, when executed by a processor of a vehicle, cause the vehicle to responsive to detecting a speeding event, generate an alert factor and send an alert to at least one of an in-vehicle output device or an outside-vehicle output device based on the alert factor; responsive to detecting a user failing to respond, increase the alert factor and send the alert for output based on the increased alert factor; receive input including at least one of: user history data, area history data, or real-time data; perform aggregated analysis on the input to generate aggregated data that summarizes the input, wherein the aggregated analysis includes one or more of to calculate a number of counts of violations, average traffic fine, time and date of traffic stops in a predefined area; perform predictive analysis on the aggregated data to generate predicted data, wherein the predictive analysis includes one or more of to predict outcomes using data modeling and advanced learning techniques, to generate speeding ticket estimates for a current scenario, or to calculate a probability of receiving a ticket based on the aggregated data; and perform prescriptive analysis on the predicted data to generate prescriptive data which includes relevant suggestions.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle alert system. More specifically, the present disclosure proposes an alert system for providing empathic alerts to a vehicle operator based on empathic factors such as age, driving record, financial status, legal status, emotional state, etc.

Figure 1:
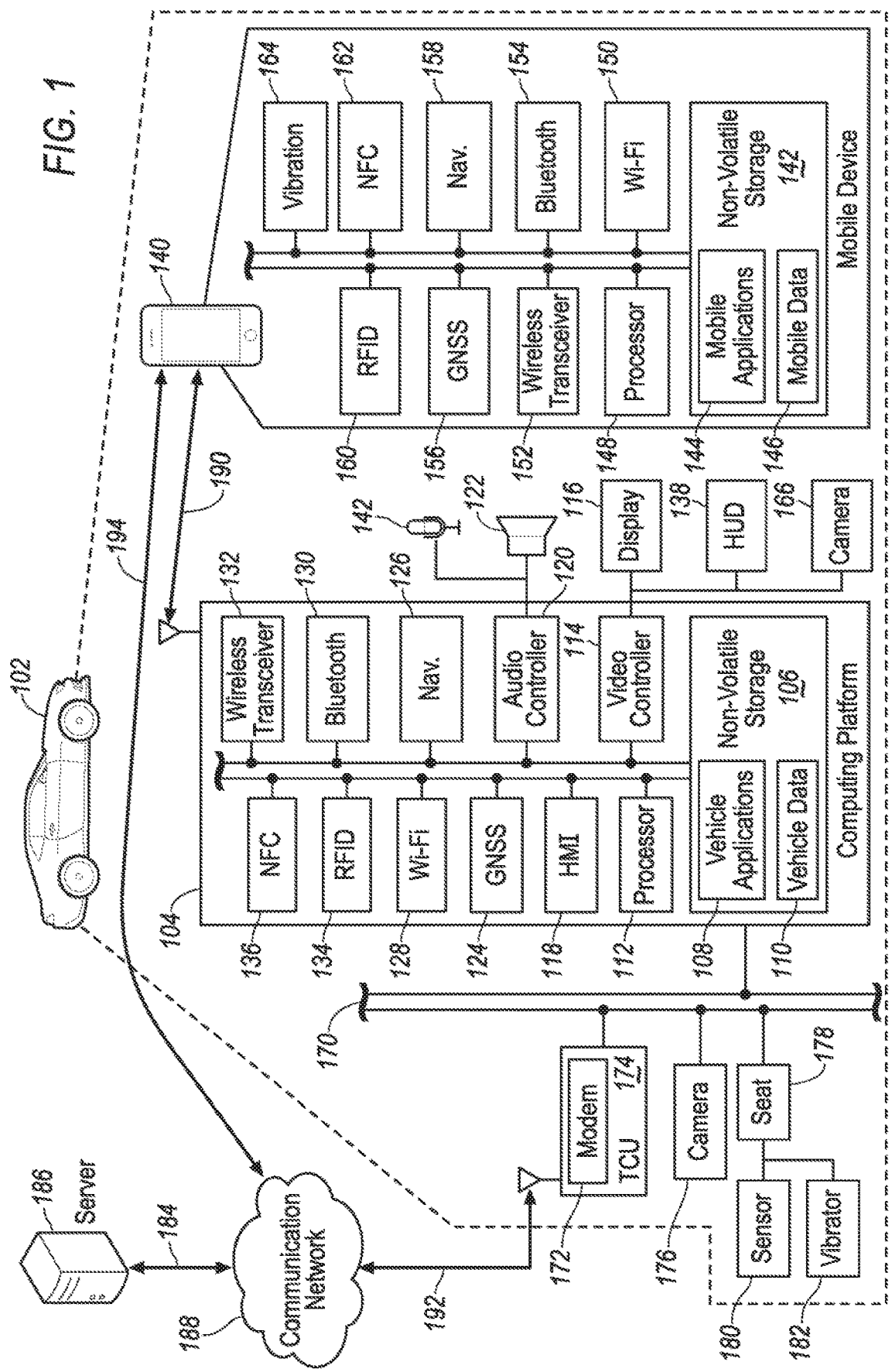
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, alert, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may further drive or otherwise communicate with one or more head-up displays (HUDs) 138 configured to provide video output to vehicle occupants by projecting a video image onto a surface (e.g. a windshield) by way of the video controller 114. The computing platform 104 may further drive or otherwise communicate with one or more interior cameras 140 configured to capture video images of vehicle occupants inside the cabin by way of the video controller 114. The computing platform 104 may also drive or otherwise communicate with one or more speakers 122 and microphones 142 configured to provide audio output and input to and from vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and etc. Map data used for route planning may be stored in the storage 106 as a part of the vehicle data 110. Navigation software may be stored in the storage 116 as a part of the vehicle applications 108.

The computing platform 104 may be configured to wirelessly communicate with a mobile device 140 of the vehicle users/occupants via a wireless connection 190. The mobile device 140 may be any of various types of portable computing device, such as cellular phones, tablet computers, wearable devices, smart watches, laptop computers, portable music players, or other device capable of communication with the computing platform 104. The wireless transceiver 132 may be in communication with a WiFi controller 128, a Bluetooth controller 130, a radio-frequency identification (RFID) controller 134, a near-field communication (NFC) controller 136, and other controllers such as a Zigbee transceiver, an IrDA transceiver (not shown), and configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GNSS controller 156.

The mobile device 140 may be provided with a wireless transceiver 152 in communication with a WiFi controller 150, a Bluetooth controller 154, a RFID controller 160, a NFC controller 162, and other controllers (not shown), configured to communicate with the wireless transceiver 132 of the computing platform 104. The mobile device 140 may be further provided with a vibration controller 164 configured to provide haptic feedback to a user via a vibrator motor (not shown).

The computing platform 104 may be further configured to communicate with various vehicle components via one or more in-vehicle network 170. The in-vehicle network 170 may include, but is not limited to, one or more of a controller area network (CAN), an Ethernet network, and a media-oriented system transport (MOST), as some examples.

The computing platform 104 may be configured to communicate with a telematics control unit (TCU) 174 configured to control telecommunication between vehicle 102 and a communication network 188 through a wireless connection 192 using a modem 172. The communication network 188 may be any type of wireless network such as a cellular network enabling the communication between a remote server 186 and the computing platform 104. It is noted that, the remote server 186 is used as a general term throughout the present disclosure and may refer to any cloud-based services involving multiple servers, computers, devices and the like.

The computing platform 104 may be further configured to communicate with an exterior camera 176 configured to capture images exterior to the vehicle 102. As an example, the exterior camera 176 may be located behind the windshield facing forward to capture video images in front of the vehicle 102. The computing platform 104 may be further configured to communicate with a seat controller 178 configured to perform sensing and control operations in relation to vehicle seat functions. The seat controller 178 may be in communication with one or more seat sensors 180 configured to detect and measure the occupancy of one or more vehicle seat. The seat sensor 180 may be provided with weight measuring features allowing the computing platform 104 to determine or estimate the type of passengers on the seat (e.g. a child or adult). The seat sensor 180 may additionally receive seat belt information, such as whether a seat belt is fastened or a length of extension of the seat belt. The seat sensor 180 may also receive information indicative of whether a car seat is attached to LATCH clips or other information indicative of the placement of a child car seat in a seating location. The seat controller 178 may be further configured to control the vibration of the vehicle seat via a seat vibrator 182.

Figure 2:
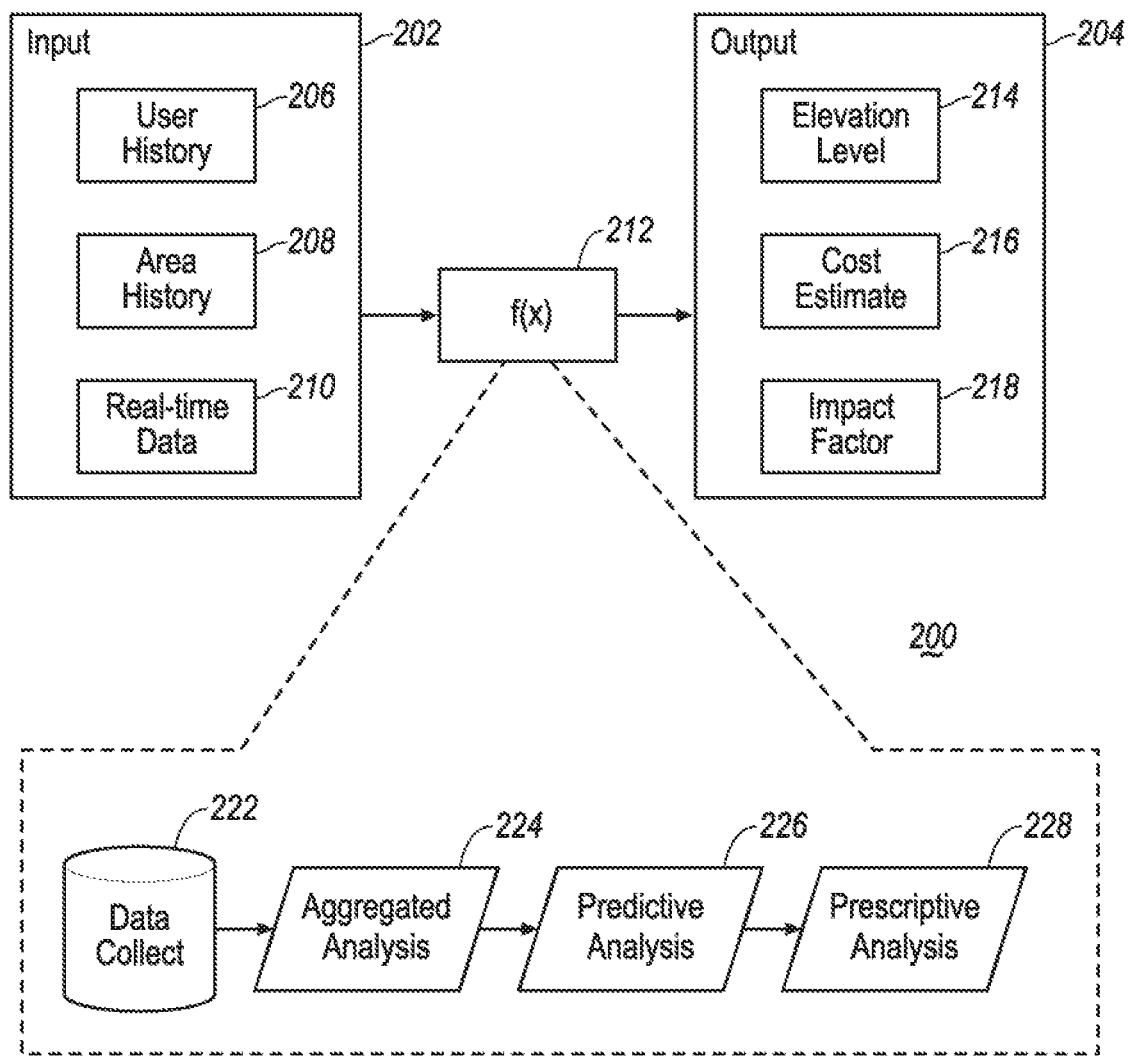
FIG. 2 illustrate an example diagram of an adaptive empathy engine of one embodiment of the present disclosure.

Referring to FIG. 2, an example block diagram of the adaptive empathy engine 200 of one embodiment of the present disclosure is illustrated. With continuing reference to FIG. 1, the computing platform 104 may be configured to collect various data as input 202 for the adaptive empathy engine 200 and generate output 204. As a few non-limiting examples, the computing platform 104 uses user history data 206, area history data 208, and real-time data 210 as input 202 to perform the adaptive empathy process 212 and to output an elevation level 214, a cost estimate 216 and an impact factor 218. The adaptive empathy process 212 may be performed on the computing platform 104 of the vehicle 102 using software, e.g., as a part of the vehicle applications 108. Input data 202 to perform the process may be collected from various components of the vehicle 102 and stored in the storage 106 as vehicle data 110.

The user history data 204 may include any data related to the behavior history of the current vehicle user/driver. For instance, the user history data 206 may include vehicle usage patterns, number of alert elevations, response to past alerts, driving record, points, age, financial situation, and/or family relationship of the current vehicle user. The identity of the current vehicle user may be determined using the interior camera 140 with facial recognition technologies or the microphone 142 with voice recognition technologies. Additionally or alternatively, the identity may be manually input via the HMI controls 118 or via remotely input via the server 186. An interested party may remotely input the identity of the vehicle user for a specific period of time via the server 186. As some non-limiting examples, the interested party may be a parent of the vehicle user, an insurance company, a car rental company or the like.

The area history data 208 may include any information of the area in which the vehicle 102 is currently traveling or anticipated to travel determined via the GNSS controller 124 and/or the navigation controller 126. For instance, the area history data 208 may include the number of accidents, aggregated driving pattern, likelihood of police presence, numbers of traffic stops, accident rate, and/or average price of ticket cost in the area.

The computing platform 104 may further collect the real-time data 210 from the server 186 via the communication network 188 in a real-time manner. The real-time data 210 may be further collected from various components of the vehicle 102. The exterior camera may be configured to capture images outside the vehicle to collect information such as road hazards, accidents, police presences or the like. The seat sensor 180 and/or the interior camera 140 may be configured to collected information about the occupancy of the vehicle 102, such as the number and type of passengers. In addition, the real-time data 210 may include information about approaching school zones, construction zones, traffic signals and stops, reported police locations, current speed, and/or duration of speeding events.

The adaptive empathy process 212 may include various predefined business rules, mathematical models, leaning algorithms to process the input data and generate output data 204. An adaptive impact factor 218 may be generated by the adaptive empathy engine 200. Multiple alert elevation levels 214 may be generated for alert output. The adaptive impact factor 218 may determine when an alert is to be issued or elevated and directs the delivery of the alert to an appropriate output device inside and/or outside the vehicle. The cost estimate 216 may include information estimated price and/or points for a ticket.

The adaptive empathy process 208 may further include multiple operations. At operation 222, the adaptive empathy engine 200 collects input data 202 from multiple sources as described above. At operation 224, the adaptive empathy engine 200 performs aggregated analysis on the data collected from operation 222. The adaptive empathy engine 200 may summarize the input data such as to calculate the number of counts of violation, average traffic fine, time and date of traffic stops in a particular area and etc., to generate meaningful insights for following operations. At operation 226, the adaptive empathy engine 200 performs a predictive analysis on the aggregated data from the previous operation. The adaptive empathy engine 200 may predict outcomes using data modeling and advanced learning techniques, and generate speeding ticket estimates for the current scenario and calculate the probability of receiving a ticket based on the aggregated data. At operation 228, adaptive empathy engine 200 generates relevant suggestions or actions based on the predicted result data by calculating the adaptive impact factor and/or the elevation level for alerts delivery. As an example, the suggestions may include asking the user to slow down in a timely manner including how and when to slow down.

Figure 3:
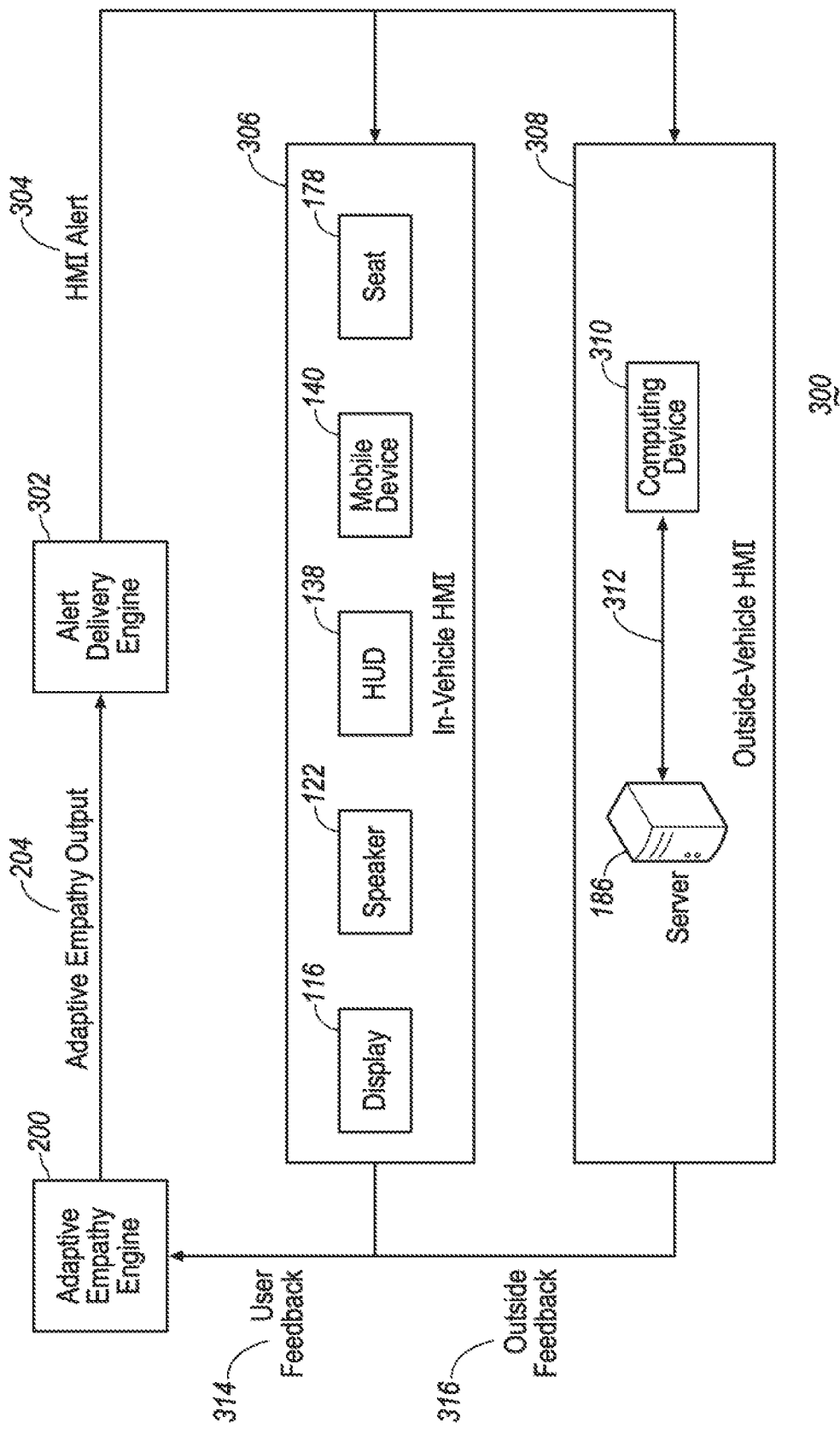
FIG. 3 illustrates an example block diagram of one embodiment of the present disclosure.

Referring to FIG. 3, an example block diagram of one embodiment of the present disclosure is illustrated. With continuing reference to FIGS. 1 and 2, responsive to receiving the adaptive empathy outputs 204 from the adaptive empathy engine 200, an alert delivery engine 302 generates an HMI alert 304 for output. The alert delivery engine 302 may be implemented in the computing platform 104 via software stored in the storage 106 as a part of the vehicle applications 108. As discussed previously, the adaptive empathy engine output 204 may include the elevation level 214, the cost estimate 216 and the impact factor 218. The alert delivery engine 302 may be configured to decide the target output device and strategy based on the adaptive impact factor 218. For instance, the output device may include an in-vehicle HMI 306 and an outside-vehicle HMI 308. The in-vehicle HMI 306 may include the display 116, the speaker 122, the HUD 138 and the mobile device 140 connected to the computing platform 104 via the wireless connection 190. The outside-vehicle HMI 308 may include one or more computing device in communication with the server 186 via a wired or wireless connection 312. For instance, the computing device may be a laptop, desktop computer, smartphone, wearable device or the like operated by interested party of the vehicle 102, such as a parent of the vehicle user, the vehicle owner, an insurance provider or rental company of the vehicle 102.

As an example, heuristic algorithms may be applied to the adaptive empathy engine 200 and the alert delivery engine 302. The HMI alert 304 with low impact factor 218 may be output to one output device such as the display 116. The computing platform 104 may incrementally add more HMI output devices for delivering the alert go increase the chance to get the attention from the user. The computing platform 104 may further adjust the elevation level 214 and the impact factor 218 over time. For instance, an HMI alert 304 may be output via the display 116 responsive to detecting a speeding event. Responsive to detecting the user of the vehicle 102 ignoring the HMI alert 304 output via the display 116 over a predefined period of time (e.g. 10 seconds) from the user feedback 314, the adaptive empathy engine may adjust the elevation level 214 and the impact factor 218, making the alert delivery engine to output a more appealing HMI alert, for instance, via the HUD 138 and speaker 122. The HMI alert 304 may continue to elevate if the user continues to fail to response. The alert delivery engine may further output the HMI alert 304 via the mobile device 140 and/or the seat 178 via vibration to alert the user. If the user still fails to response, the alert 304 may be elevated to the outside-vehicle HMI via the server 186 through the TCU 174.

Both the user feedback 314 and outside feedback 316 may be provided to the adaptive empathy engine 200 for further adjustment. The user feedback 314 may include information about a response pattern of a particular user including which in-vehicle HMI the user responded to, and/or how long it takes for the user to respond. The outside feedback 316 may a command or message sent from the computing device 310 via the server 186. With the user feedback 314 and the outside feedback 316, the adaptive empathy engine 200 may recalculate the outputs 204 for future alerts. For instance, for a vehicle user who rarely respond to a low-impact factor alert output via the display 116, the adaptive empathy engine 200 may skip such impact factor 218 and directly elevate the alert for a future speeding event.

Figure 4:
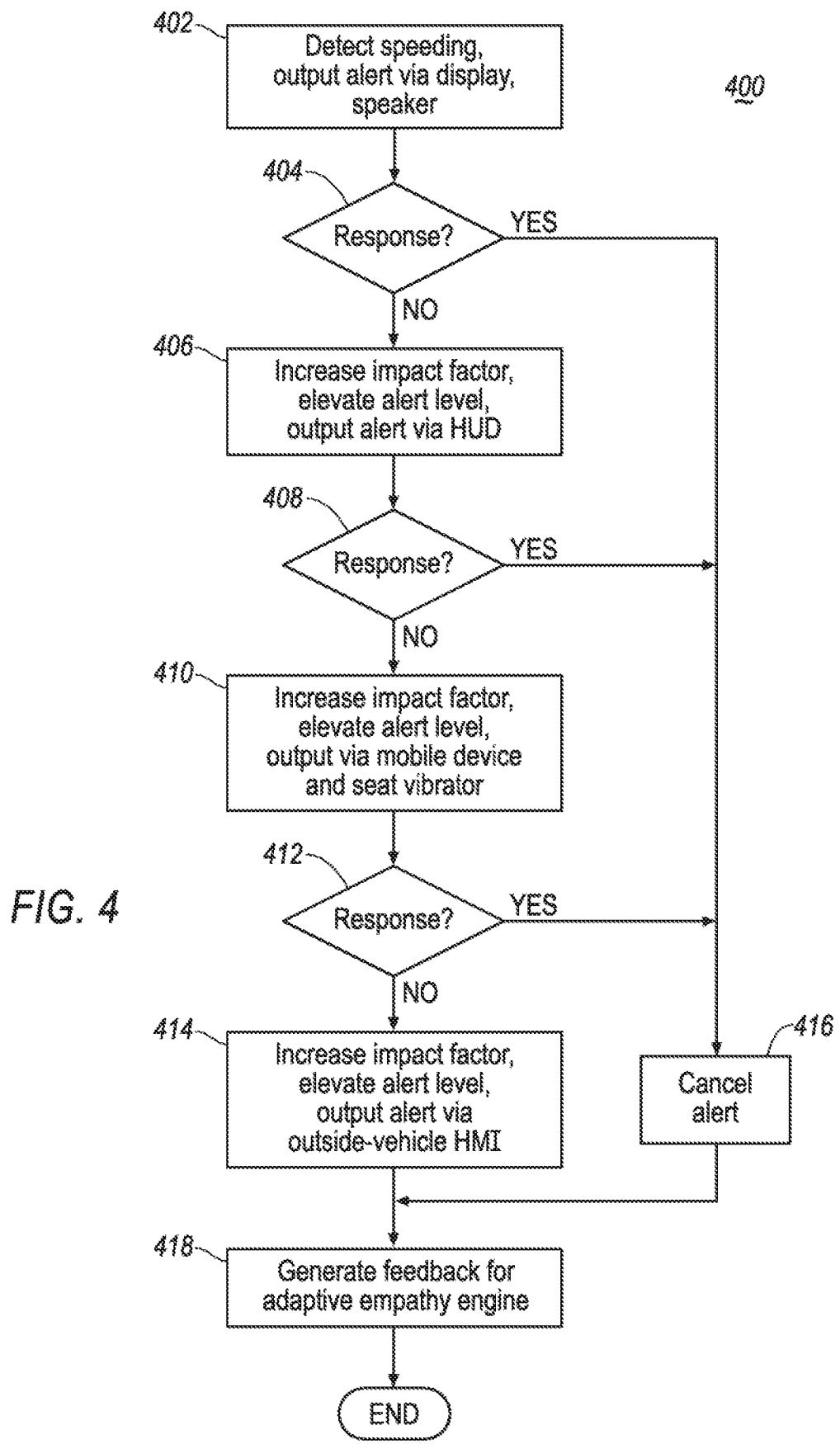
FIG. 4 illustrates an example flow diagram of one embodiment of the present disclosure.

Referring to FIG. 4, an example flow diagram for a process 400 of one embodiment of the present disclosure is illustrated. At operation 402, the computing platform 104 detects a speeding event and outputs a speed alert 304 via the display 116 and the speaker 122. As discussed previously, various input data 202 may be aggregated 224, allowing the speed alert 304 to include empathic information for the vehicle user which increases the chance that the user will respond the speed alert 304 by slowing down. For instance, the alert 304 may include a message such as "Children detected in the vehicle, please slow down for their safety," "average price for speeding ticket in this area is $200" or the like. Information included in the message are input and processed via the adaptive empathy engine 200 and therefore are accurate and relevant in general.

A timer may be set for the user to respond to the speed alert 304. For instance, responsive to detecting the user has responded to the alert 304 within a predefined time period (e.g. 10 seconds) at operation 404, the process proceeds to operation 416 and the computing platform 104 cancels the alert. Otherwise, the process proceeds to operation 406. At operation 406, the computing platform 104 increases the impact factor 218, elevate the alert level 214 and further output the alert 304 via the HUD 138. The alert 304 may further include messages such as "your driver's license is 2 points away from suspension and your current speed may cost you 3 points" to further attempt to persuade the vehicle user to slow down.

Responsive to detecting the user has responded to the speed alert 304 within a predefined time period, the process proceeds to operation 416. Otherwise, the process 400 proceeds to operation 410. It is noted that a different timer may be used at operation 408. For instance, the timer may be shorter (e.g. 6 seconds) as compared with the timer used at operation 404 as the alert level has been elevated. At operation 410, the computing platform 104 further increases the impact factor 218, elevates the alert level 214, and output the alert 304 via the mobile device 140 and the seat controller 178 by way of vibration to provide a physical feeling to the vehicle user.

If the vehicle user is still not responding within a predefined time period (e.g. 4 seconds) at operation 412, the process proceeds to operation 414 and the computing platform 104 further increases the impact factor 218, elevates the alert level 214, and outputs the alert 304 to the outside-vehicle HMI, such as the computing device 310 operated by a parent of the vehicle user or an insurance provider. At operation 418, the computing platform 104 generates feedback 314 for the adaptive empathy engine 200 for future reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a controller, programmed to
responsive to detecting a speeding event, generate an alert factor and send an alert to an in-vehicle output device for video and audio output based on the alert factor,
responsive to detecting a user failing to respond, increase the alert factor and send the alert to a mobile device associated with the user wirelessly connected to the vehicle for vibration output from the mobile device based on the alert factor as increased, and
responsive to detecting the user further failing to respond, further increase the alert factor and send the alert to an outside vehicle output device for output based on the alert factor as further increased.

2. The vehicle of claim 1, wherein the controller is further programmed to:
receive input including at least one of: user history data, area history data, or real-time data; and
perform aggregated analysis on the input to generate aggregated data that summarizes the input.

3. The vehicle of claim 2, wherein the aggregated analysis includes one or more of to calculate a number of counts of violations, average traffic fine, time and date of traffic stops in a predefined area.

4. The vehicle of claim 2, wherein the user history data includes at least one of: vehicle usage patterns, response to past alerts of a user, user driving record, user points, user age, user financial situation, or user family relationship.

5. The vehicle of claim 2, wherein the area history data includes at least one of: number of accidents within a predefined area being traversed by the vehicle, aggregated driving pattern within the area, likelihood of police presence within the area, numbers of traffic stops within the area, accident rate within the area, or average price of ticket cost within the area.

6. The vehicle of claim 2, wherein the real-time data includes at least one of: locations of school zones, locations of construction zones, locations and timing information for traffic signals, and reported locations of traffic enforcement.

7. The vehicle of claim 2, wherein the controller is further programmed to
perform predictive analysis on the aggregated data to generate predicted data, wherein the predictive analysis includes one or more of to predict outcomes using data modeling and advanced learning techniques, to generate speeding ticket estimates for a current scenario, or to calculate a probability of receiving a ticket based on the aggregated data.

8. The vehicle of claim 7, wherein the controller is further programmed to perform prescriptive analysis on the predicted data to generate prescriptive data which includes relevant suggestions.

9. The vehicle of claim 8, wherein the controller is further programmed to output at least one of: an alert elevation level, a cost estimate, or an alert factor.

10. The vehicle of claim 1, wherein the in-vehicle output device includes at least one of: a display, a head-up display (HUD), or a speaker.

11. The vehicle of claim 1, wherein the controller is further programmed to wirelessly send the alert to the outside-vehicle output device via a telematics control unit (TCU) through a wireless network.

12. A method for a vehicle, comprising:
collecting input data including at least one of: user history data, area history data, or real-time data;
responsive to detecting the vehicle is speeding, generating an alert impact factor based on the input data;
outputting an alert via an in-vehicle output device based on the alert impact factor;
responsive to detecting a user failing to respond, increasing the alert impact factor and sending the alert to a mobile device associated with the user wirelessly connected to the vehicle for vibration output from the mobile device based on the alert factor as increased; and
responsive to detecting the user further failing to respond, further increasing the alert factor and sending the alert to an outside-vehicle output device based on the alert factor as further increased.

13. The method of claim 12, further comprising:
performing aggregated analysis on the input data to generate aggregated data that summarizes the input data, wherein the aggregated analysis includes one or more of to calculate a number of counts of violations, average traffic fine, time and date of traffic stops in a predefined area.

14. The method of claim 13, further comprising:
performing predictive analysis on the aggregated data to generate predicted data, wherein the predictive analysis includes one or more of to predict outcomes using data modeling and advanced learning techniques, to generate speeding ticket estimates for a current scenario, or to calculate a probability of receiving a ticket based on the aggregated data.

15. The method of claim 14, further comprising:
performing prescriptive analysis on the predicted data to generate prescriptive data which includes relevant suggestions.

16. The method of claim 12, wherein the user history data includes at least one of: vehicle usage patterns, response to past alerts of a user, user driving record, user points, user age, user financial situation, or user family relationship.

17. The method of claim 12, wherein the area history data includes at least one of: number of accidents, aggregated driving pattern, likelihood of police presence, numbers of traffic stops, accident rate, or average price of ticket cost of a predefined area.

18. The method of claim 12, wherein the real-time data includes at least one of: school zones, construction zones, traffic signals, reported police locations.

19. The method of claim 12, further comprising:
receiving an outside-vehicle feedback from the outside-vehicle output device.

20. A non-transitory computer-readable medium comprising instructions that, when executed by a processor of a vehicle, cause the vehicle to:
responsive to detecting a speeding event, generate an alert factor and send an alert to an in-vehicle output device based on the alert factor;
responsive to detecting a user failing to respond, increase the alert factor and send the alert to an outside-vehicle output device for output based on the alert factor as increased;
responsive to detecting the user further failing to respond, further increase the alert factor and send the alert to a mobile device for output based on the alert factor as further increased;
receive input including at least one of: user history data, area history data, or real-time data;
perform aggregated analysis on the input to generate aggregated data that summarizes the input, wherein the aggregated analysis includes one or more of to calculate a number of counts of violations, average traffic fine, time and date of traffic stops in a predefined area;
perform predictive analysis on the aggregated data to generate predicted data, wherein the predictive analysis includes one or more of to predict outcomes using data modeling and advanced learning techniques, to generate speeding ticket estimates for a current scenario, or to calculate a probability of receiving a ticket based on the aggregated data; and
perform prescriptive analysis on the predicted data to generate prescriptive data which includes relevant suggestions.

* * * * *